Figure 1:
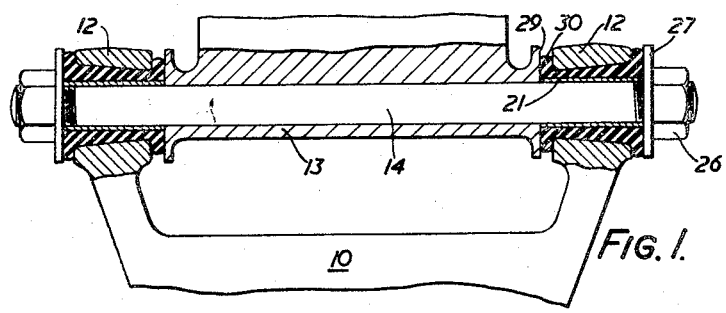

May 17, 1960

P. C. HUTTON 2,937,040

FLEXIBLE COUPLINGS FOR AXIALLY
ALIGNED, PIVOTALLY
CONNECTED MEMBERS
Filed Jan. 6, 1958

INVENTOR
PHILLIP C. HUTTON
BY
Holcombe, Wetherill & Brisebois
ATTORNEYS

United States Patent Office 2,937,040
Patented May 17, 1960

2,937,040

FLEXIBLE COUPLINGS FOR AXIALLY ALIGNED, PIVOTALLY CONNECTED MEMBERS

Philip Charles Hutton, Crawley, England, assignor to Silentbloc Limited, Crawley, England, a company of Great Britain Application January 6, 1958, Serial No. 707,318

Claims priority, application Great Britain January 7, 1957

4 Claims. (Cl. 287—85)

This invention relates to flexible joints of the type including a bushing of rubber or like resilient material interposed between outer and inner coaxial members of comparatively rigid material.

The applicants have previously proposed various types of such joint in which the bore in the outer member is of double frusto-conical form with its minimum radius in the region of the middle of the outer member, and a pair of bushings, each stretched round a cylindrical inner member, are axially compressed so as to be radially expanded both in the space between the inner and outer members and to form end flanges projecting radially outwards beyond the end of the bore in the outer member to lie between the ends of this outer member and side plates or the like secured to the inner member as by a bolt passing through the inner member.

According to the present invention a flexible joint comprises an outer comparatively rigid sleeve having in it a frusto-conical bore and a comparatively rigid inner member lying within the bore but spaced from it to leave an annular space, and an annular rubber or like bushing compressed axially within the space and having at each end a flange overlapping the end of the bore and axially compressed between the adjacent face of the outer sleeve and a thrust member secured to the inner member.

The present invention is particularly concerned with the application of a pair of such joints as a hinge between two axially spaced end sleeves and at least one other body. According to another aspect of the present invention therefore a flexible joint of the hinge type between two axially spaced sleeves and at least one other body includes a bushing of rubber interposed between each sleeve and an inner member passing coaxially through it, and also passing through or secured to the body, the bore in each sleeve being of frusto-conical form and each bushing being stretched over the inner member and axially compressed between the body, or a member abutting it, and a thrust member secured to the inner member at the end of the bushing remote from the body, so as to form or enlarge a flange at each end of the bushing projecting radially outwards beyond the end of the bore in the sleeve, at one end between the sleeve and the body, and at the other end between the sleeve and the thrust member.

In a preferred arrangement the body lies between the spaced sleeves and the frusto-conical bores have their minimum radii adjacent the body.

The, or each, bushing is preferably stretched over the inner member.

Preferably each bushing is preformed with a flange at its larger end, that is to say it is a flange when in its undistorted form. In one form of the invention each bushing in its free state has a cylindrical extension at the smaller end of its frusto-conical portion to form the flange at this end when assembled. In an alternative form each bushing in its free state has at its smaller end a preformed flange of larger diameter than the small end of the frusto-conical portion but not so large as to prevent it from being sprung through the smaller end of the bore in the end sleeve.

Figure 2:
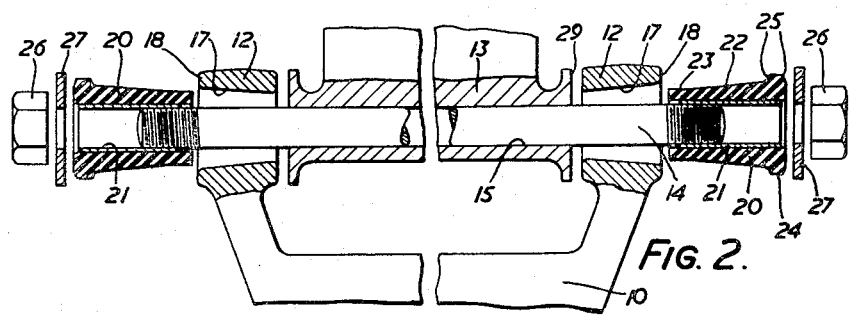
Figure 3:
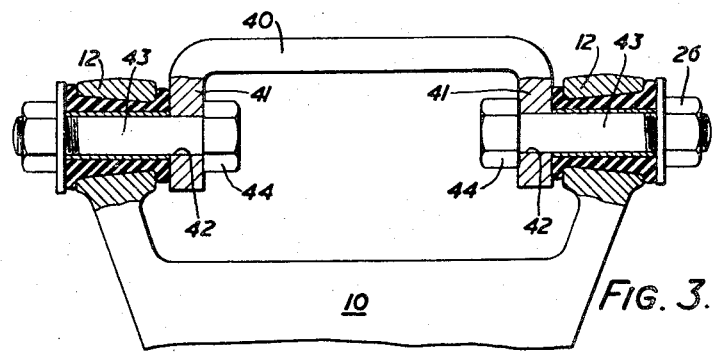
Figure 4:
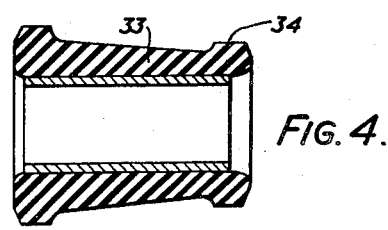

The invention may be carried into practice in various ways but a number of specific embodiments will be described by way of example with reference to the accompanying drawings in which:

Figure 1 is a section of a hinge joint employed in the independent suspension system of a motor car, Figure 2 is a view similar to Figure 1 showing the parts of the joint before they are clamped together, Figure 3 is a view similar to Figure 1 of a modified form of joint, and Figure 4 is a longitudinal section of a modified form of bushing which may be employed in joints of the type shown in Figures 1 to 3.

The embodiments shown are applied to a flexible pivotal joint of the hinge type employed for the wishbone of the independent suspension system of a motor car. The wish-bone 10 of Figures 1 and 2 affords a pair of axially spaced end sleeves 12 whilst the co-operating portion of the frame in Figures 1 and 2 affords a central sleeve 13 located between them. A bolt 14 passes coaxially through the three sleeves and the central sleeve 13 has in it a cylindrical bore 15 into which the bolt fits and into which it is secured in any suitable manner. Each of the end sleeves 12 has in it a frusto-conical bore 17 with its larger end 18 outermost. Between the frusto-conical bore and the bolt is interposed a bushing 20 of rubber or like material which is stretched around a tubular metal liner 21. The bushing, in its undistorted form, has a uniform internal diameter slightly less than the external diameter of the liner 21 and is rather longer than the liner. The central portion 22 of the outer surface of the bushing is of frusto-conical form corresponding roughly with the bore 17 in the end sleeve and, at its smaller end, the bushing has a cylindrical extension 23 of the same diameter as the smaller end of the frusto-conical portion 22 whilst at its other end it has a flange 24 of rather larger diameter than the larger end of the frusto-conical portion 22, and bounded by a cylindrical peripheral surface having two bevelled edges 25 inclined to one another at approximately 70°.

In assembling the joint the bolt 15 is thrust through the central sleeve 13 and the end sleeves 12, after which the bushings 20 with their liners 21 are fitted over the ends of the bolt and tightened up and secured by means of nuts 26 and flat washers 27.

As the nuts are tightened each bushing 20, which is already stretched over its liner 21, is axially compressed between the end face 29 of the central sleeve 13 and the washer 27, which serves as a thrust member at its outer end. The axial compression serves not only to force the frusto-conical surface of the bushing firmly into contact with the corresponding surface of the bore of the end sleeve, but also enlarges the flange 24 at the outer end of the bushing and, in addition, as shown in Figure 1, squeezes out the cylindrical portion 23 on its smaller inner end so as to form a flange 30 between the end sleeve and the central sleeve 13. The nuts are tightened up until the liners 21 are rigidly held between the central sleeve and the washers 27, and the liners are thereby prevented from turning relatively to the central sleeve. Accordingly all rotary movement between the central sleeve and the end sleeves is taken up in the material of the two bushings 20.

In an alternative embodiment shown in Figure 4 the bushing 33 in its undistorted form instead of having a cylindrical extension at its smaller inner end is formed with a slight outwardly projecting annular flange 34 at that end. The flange is sufficiently shallow to enable it to be compressed to pass through the inner end of the frusto-conical bore in the end sleeve but having passed through it, it initiates the formation of the flange which is then enlarged by subsequent compression between the end sleeve and the central sleeve.

It will be appreciated that the invention may be applied to joints of the type in which the bushings are bonded to the inner member but it is particularly applicable to the type of joint in which the bushing adheres frictionally both to the inner member and to the outer member and is circumferentially stretched during application to the inner member so that its frictional grip on the inner member in the assembled joint is due partly to this stretching and partly to the radial compression imposed on the part of the bushing between the inner and outer members by the axial force pressing it into the annular space between these members.

Figure 3 illustrates an alternative arrangement in which the central sleeve is replaced by a U-shaped bracket 40 the two legs 41 of which have bores 42 through which short bolts 43 pass, one for each bushing. Heads 44 at the inner ends of these bolts enable the bushings to be clamped up as in the first embodiment.

What I claim as my invention and desire to secure by Letters Patent is:

1. A flexible joint of the hinge type between two axially spaced sleeves and at least one other body including a bushing of rubber interposed between each sleeve and an inner member passing coaxially through it, and also passing through or secured to the body, the bore in each sleeve being of frusto-conical form and each bushing being stretched over the inner member and axially compressed between the body, or a member abutting it, and a thrust member secured to the inner member at the end of the bushing remote from the body, so as to form or enlarge a flange at each end of the bushing projecting radially outwards beyond the end of the bore in the sleeve, at one end between the sleeve and the body, and at the other end between the sleeve and the thrust member.

2. A flexible joint comprising an outer comparatively rigid sleeve having in it a frusto-conical bore and a comparatively rigid inner member lying within the bore but spaced from it to leave an annular space, and an annular rubber or like bushing compressed axially within the space and having at each end a flange overlapping the end of the bore and axially compressed between the adjacent face of the outer sleeve and a thrust member secured to the inner member, in which the bushing in its free state has at its smaller end a pre-formed flange of larger diameter than the small end of the frusto-conical portion but not so large as to prevent it from being sprung through the smaller end of the bore in the end of the sleeve.

3. A joint as claimed in claim 1, in which each bushing is pre-formed with a flange at its larger end and in its free state has a cylindrical extension at the smaller end of its frusto-conical portion to form the flange at this end when assembled.

4. A joint as claimed in claim 1 in which each bushing in its free state has at its smaller end a pre-formed flange of larger diameter than the small end of the frusto-conical bushing but not so large as to prevent it from being sprung through the smaller end of the bore in the end sleeve.

References Cited in the file of this patent

UNITED STATES PATENTS

| | | |
|---|---|---|
| 1,750,346 | Chilton | Mar. 11, 1930 |
| 2,346,574 | Guy | Apr. 11, 1944 |
| 2,422,327 | Winslow | June 17, 1947 |
| 2,621,949 | Grantham | Dec. 16, 1952 |
| 2,787,486 | Thiry | Apr. 2, 1957 |
| 2,797,929 | Herbenar | July 2, 1957 |
| 2,853,325 | Ward | Sept. 23, 1958 |
| 2,880,991 | Ward | Apr. 7, 1959 |

FOREIGN PATENTS

| | | |
|---|---|---|
| 616,294 | France | Oct. 26, 1926 |
| 775,604 | Great Britain | May 29, 1957 |